United States Patent
Pam

(10) Patent No.: US 11,297,969 B2
(45) Date of Patent: Apr. 12, 2022

(54) PROCESSING DEVICE FOR USE WITH FRUITS AND/OR VEGETABLES

(71) Applicant: Nathan Neryah Peleh Pam, Portland, OR (US)

(72) Inventor: Nathan Neryah Peleh Pam, Portland, OR (US)

( * ) Notice: Subject to any disclaimer, the term of this patent is extended or adjusted under 35 U.S.C. 154(b) by 104 days.

(21) Appl. No.: 16/516,508

(22) Filed: Jul. 19, 2019

(65) Prior Publication Data
US 2020/0022523 A1   Jan. 23, 2020

Related U.S. Application Data

(60) Provisional application No. 62/701,380, filed on Jul. 20, 2018.

(51) Int. Cl.
*A47J 17/02* (2006.01)
*B26B 11/00* (2006.01)

(52) U.S. Cl.
CPC ............... *A47J 17/02* (2013.01); *B26B 11/00* (2013.01)

(58) Field of Classification Search
CPC .. A47J 17/00; A47J 17/02; A47J 17/04; A47J 17/06; A47J 17/08; A47J 17/10; A47J 19/02; A47J 19/023; A47J 43/255; A47J 43/25; B26B 11/00; B26D 3/26
USPC ............ 30/123.5–123.7, 301–303, 315–316, 30/279.6; 246/482; 83/425.3
See application file for complete search history.

(56) References Cited

U.S. PATENT DOCUMENTS

| | | | | |
|---|---|---|---|---|
| 1,517,339 A | * | 12/1924 | Brown ................... | A47J 19/023 99/508 |
| 2,137,366 A | * | 11/1938 | Sundstrand ........... | A47J 43/255 241/93 |
| 2,912,757 A | * | 11/1959 | Knight .................... | A47J 17/00 30/303 |
| 4,334,557 A | * | 6/1982 | YaSenka ................ | B26D 1/553 141/331 |
| 5,101,718 A | * | 4/1992 | Lin .......................... | A23N 4/18 30/302 |
| 5,937,525 A | * | 8/1999 | Chan ........................ | A47J 25/00 30/123.6 |
| 2010/0252669 A1 | * | 10/2010 | Romano ............... | A47J 43/255 241/273.2 |
| 2010/0263212 A1 | * | 10/2010 | Settele ..................... | B26B 9/02 30/113.1 |
| 2014/0150676 A1 | * | 6/2014 | Cinquini ................ | A47J 17/02 99/592 |
| 2014/0338507 A1 | * | 11/2014 | Whewell, Jr. ........... | A47J 17/02 83/13 |
| 2015/0010682 A1 | * | 1/2015 | Sotoohi ................ | A47J 19/023 426/489 |
| 2017/0181563 A1 | * | 6/2017 | Waldner ................. | A47J 17/18 |

(Continued)

*Primary Examiner* — Nhat Chieu Q Do
(74) *Attorney, Agent, or Firm* — Tod A. Kupstas

(57) ABSTRACT

A processing device for processing fruit and/or vegetables. The processing device may have a lip and at least one blade. The processing device may be mounted on cup or bowl. A user of the processing device will move the fruit and/or vegetable against the lip of the processing device. The skin or rind of the fruit or vegetable will be removed via the motion of the fruit and/or vegetable against the lip of the processing device. When there are blades present the blades can also slice the fruit or vegetable during the same movement that removes the skin from the fruit and/or vegetable.

11 Claims, 4 Drawing Sheets

(56) References Cited

U.S. PATENT DOCUMENTS

2018/0132647 A1* 5/2018 Tateno .................... A47J 25/00
2018/0271327 A1* 9/2018 Haskins ................. A47J 42/14

* cited by examiner

PROCESSING DEVICE FOR USE WITH FRUITS AND/OR VEGETABLES

This application claims the benefit of U.S. Provisional Patent Application Ser. No. 62/701,380 filed Jul. 20, 2018, the contents of which are incorporated herein by reference.

BACKGROUND

1. Field

This application is directed to the field of kitchen tools. In particular, the application is directed to a processing device for slicing and/or peeling fruits and/or vegetables.

2. Description of the Related Art

Various fruits and/or vegetables can prove to be difficult to process by peeling or slicing. While there are a variety of tools available for processing fruits and vegetables, not every tool is suitable for some types of fruits.

SUMMARY

Briefly described, aspects of the present disclosure relate to food processing devices.

An aspect of the present disclosure may be a method for processing a fruit or vegetable. The method comprises pressing a fruit or vegetable against a processing device, wherein the processing device comprises a lip and at least one blade. Moving the fruit or vegetable in a direction that moves the fruit or vegetable against the lip of the processing device, wherein movement of the fruit or vegetable against the lip of the processing device removes the skin of the fruit or vegetable. Wherein movement against the at least one blade slices the fruit or vegetable.

Another aspect of the present disclosure may be a processing device for fruits and/or vegetables comprising; a lip, wherein the lip is adapted to remove a skin from a fruit or vegetable when the fruit or vegetable is pressed on the lip; and at least one blade located proximate to the lip, wherein the at least one blade is positioned to slice the fruit or vegetable during the movement of the fruit or vegetable over the lip.

Still yet another aspect of the present disclosure may be a processing system for fruits or vegetables. The processing system for fruits or vegetables may have a processing device comprising; a lip, wherein the lip is adapted to remove a skin from a fruit or vegetable when the fruit or vegetable is pressed on the lip; at least one blade located proximate to the lip, wherein the at least one blade is positioned to slice the fruit or vegetable during the movement of the fruit or vegetable over the lip; and a base portion positioned with respect to the lip and the at least one blade, wherein the base portion to receive the processed fruit or vegetable.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

To facilitate an understanding of embodiments, principles, and features of the present disclosure, they are disclosed hereinafter with reference to implementation in illustrative embodiments. Embodiments of the present disclosure, however, are not limited to use in the described systems or methods and may be utilized in other systems and methods as will be understood by those skilled in the art familiar with this disclosure.

The processing device disclosed herein may be used with any fruit or vegetable that can benefit from slicing or peeling. While the processing device discussed herein will be discussed with respect to a particular fruit, other fruits may be used as well. For instance, while the processing device is discussed with respect to the peeling and cutting of a mango, the processing device may be used with avocados, oranges and the like. However, the processing device is generally favourable to the processing of a mango, which can prove to be a more difficult fruit to handle. For ease of discussion, by way of example, the processing device will be discussed with respect to a fruit and to a mango in particular.

Figure 1:
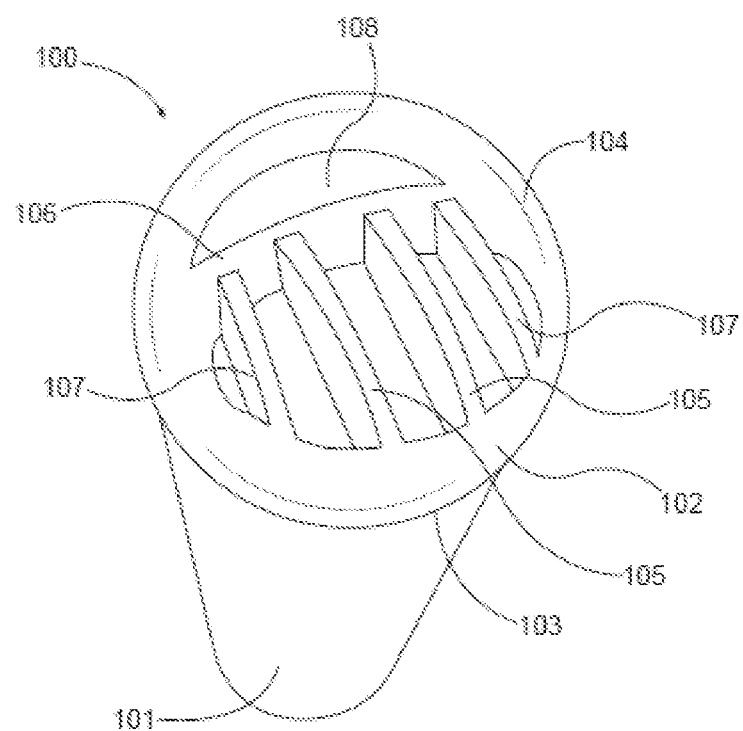
FIG. 1 is a top down view of a processing device placed on a glass.
Figure 2:
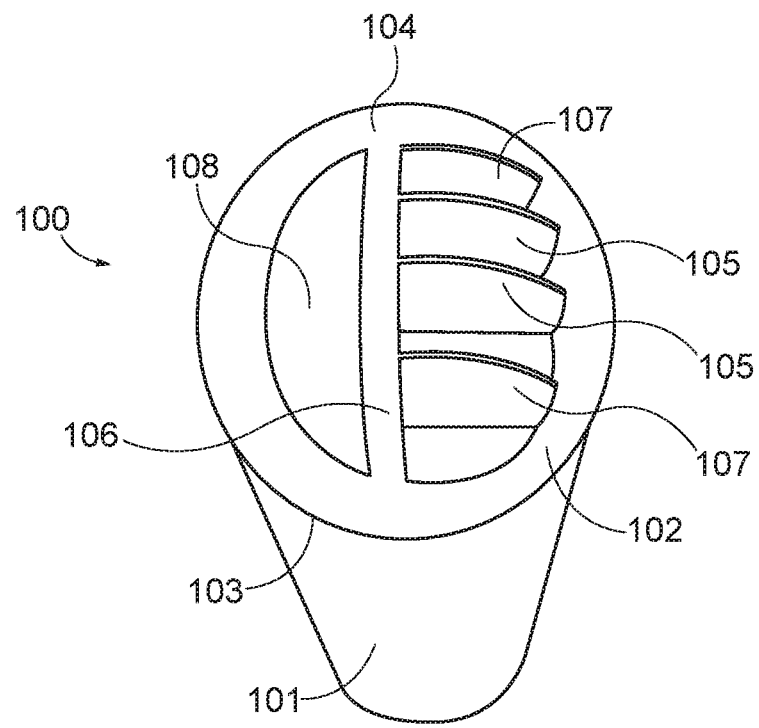
FIG. 2 is another top down view of the processing device placed on a glass.
Figure 3:
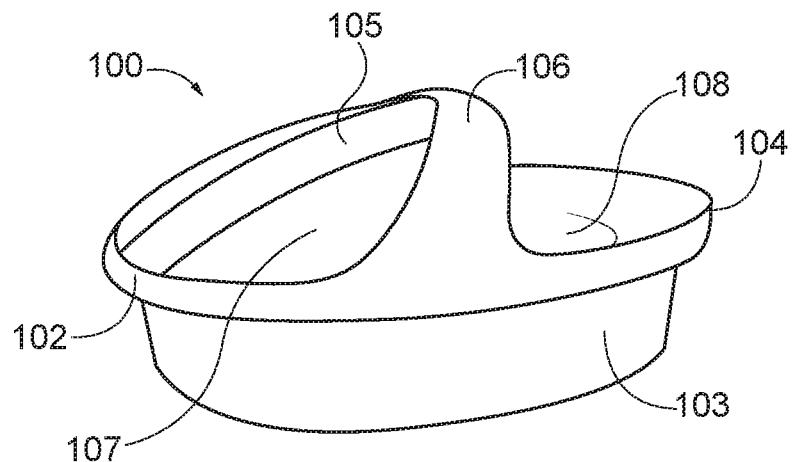
FIG. 3 is a side view of the processing device.
Figure 4:
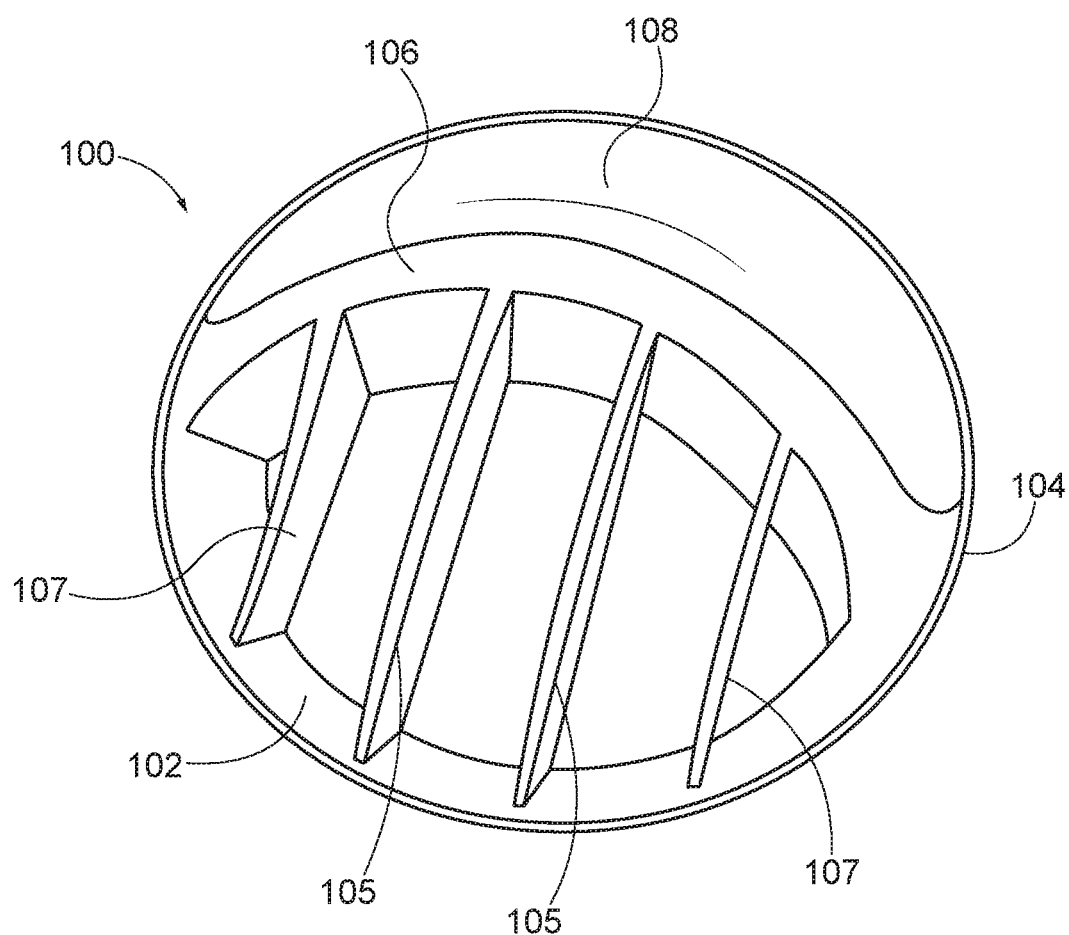
FIG. 4 is a top down view of the processing device.

Turning to FIGS. 1-5, various views of a processing device 100 made in accordance with an embodiment of the disclosure are shown. The processing device 100 shown in FIGS. 1-5 is circular in form. The processing device 100 may be sized so as to fit on the rim of a pint-sized glass, such as the glass 101 shown in FIGS. 1 and 2. Base portion 103, shown in FIG. 3, is sized to fit into a glass 101 so that the perimeter 104 of the processing device 100 abuts the glass 101. While the processing device 100 is shown fitted to a pint-sized glass, other sizes may also be possible. In an embodiment, the processing device is sized to fit onto the rim of a bowl. In an embodiment, the processing device is sized to fit onto a mason jar. Furthermore, while a circular shaped processing device is shown, other shapes may be used as well, such as square, rectangular, triangular, etc. In an embodiment, the shape of the processing device is shaped to fit on the particular receptacle in which the peeled fruit will be placed. In an embodiment, the processing device is designed to have adjustable features so as to accommodate variously sized containers. In an embodiment, the processing device has attachments that are able to be connected thereto so as to fit the processing device on various containers and bases.

In an embodiment, the processing device may be formed with a base portion, as opposed to being attached to a glass or other container, that may be detachable. In an embodiment, the processing device comprises a twist on and twist off base portion, with the interior rim of the processing device have a screw-thread construction with which to screw the processing device on and off. In an embodiment, the processing device is sized and adapted to be twisted on and off a mason jar or the like. In an embodiment, the processing device is snapped on and off a base portion. In an embodiment, the processing device is integrally formed with the processing device and has a base portion that has a bottom portion that is opened by a hinge apparatus so that processing device is able to be opened by the hinge like apparatus.

Returning to FIGS. 1-5, the processing device comprises a lip 102. The lip 102 forms a portion of the perimeter 104 of the processing device 100. The lip 102 may be adapted to cut into the skin of the fruit. The lip 102 may preferably edged so as to be able to enter into the skin of the fruit and proceed to remove the skin of the fruit. During use of the processing device 100, movement of a fruit in the downward direction will further remove the skin of the fruit and the deskinned fruit will pass into the base portion.

Additionally, the processing device may have at least one blade 105. In an embodiment, the processing device has a plurality of blades 105, 107. The blades 105, 107 extend from the lip 102 of the processing device 100 to a blade support structure 106. Each of the blades 105, 107 shown is substantially parallel with respect to each other of the blades 105, 107 shown. In FIGS. 1-5 the blades 105, 107 have different lengths. In the embodiment, shown two of the blades 105 have the same length while two other blades 107 have a different shorter length. In an embodiment, the two middle blades 105 are substantially the same length and the two shorter blades 107 are substantially the same length.

Still referring to FIGS. 1-5, the blades 105, 107 extend from the lip 102 and are angled from the lip 102 to the blade support structure 106. The blade support structure 106 extends from one part of the perimeter 104 of the processing device 100 another portion of the perimeter 104 of the processing device 100. The blades 105, 107 are orthogonally positioned with respect to the blade support structure 106. In embodiment, the blade support structure extends the diameter of the processing device. In an embodiment, the blade support structure extends less than the diameter of the processing device. It should be understood that when the processing device is formed as different shapes and configurations the blade support device may be placed in an area that is sufficient to provide sufficient support strength in order to accommodate the motion and force of the fruit being placed against the blades.

In an embodiment, the blades extend over half of the circular area. In an embodiment, the blades are serrated. The blade or blades may also be made of any number of materials, such as plastic, ceramic, metal, etc. The blades may be replaceable or exchanged for other types of blades for handling different types of fruits and/or vegetables. In an embodiment, the blades may have a variety of shapes for peeling the fruit. In an embodiment, variable shaped blades may be interchanged with other variable shaped blades that may be able to provide different peeling and processing functions of the fruit or vegetable.

Returning to FIGS. 1-5, sliced fruit can be removed through the opening 108 of the processing device 100. The opening 108 is that section of the processing device 100 that does not have the blades 105, 107 extending across it. In FIGS. 1-5, the opening 108 comprises half of the processing device. In an embodiment, the opening is a third of the processing device. In an embodiment, the opening is two-thirds the processing device.

Alternatively, instead of having an opening, the processing device can be removed from the base portion and the sliced portions of the fruit can be retrieved from the base portion. In an embodiment, the juices produced by the peeling and slicing process may be captured and/or stored in the base portion. In an embodiment, the processing device is attached to a container that is able to be seal and refrigerated.

Figure 5:
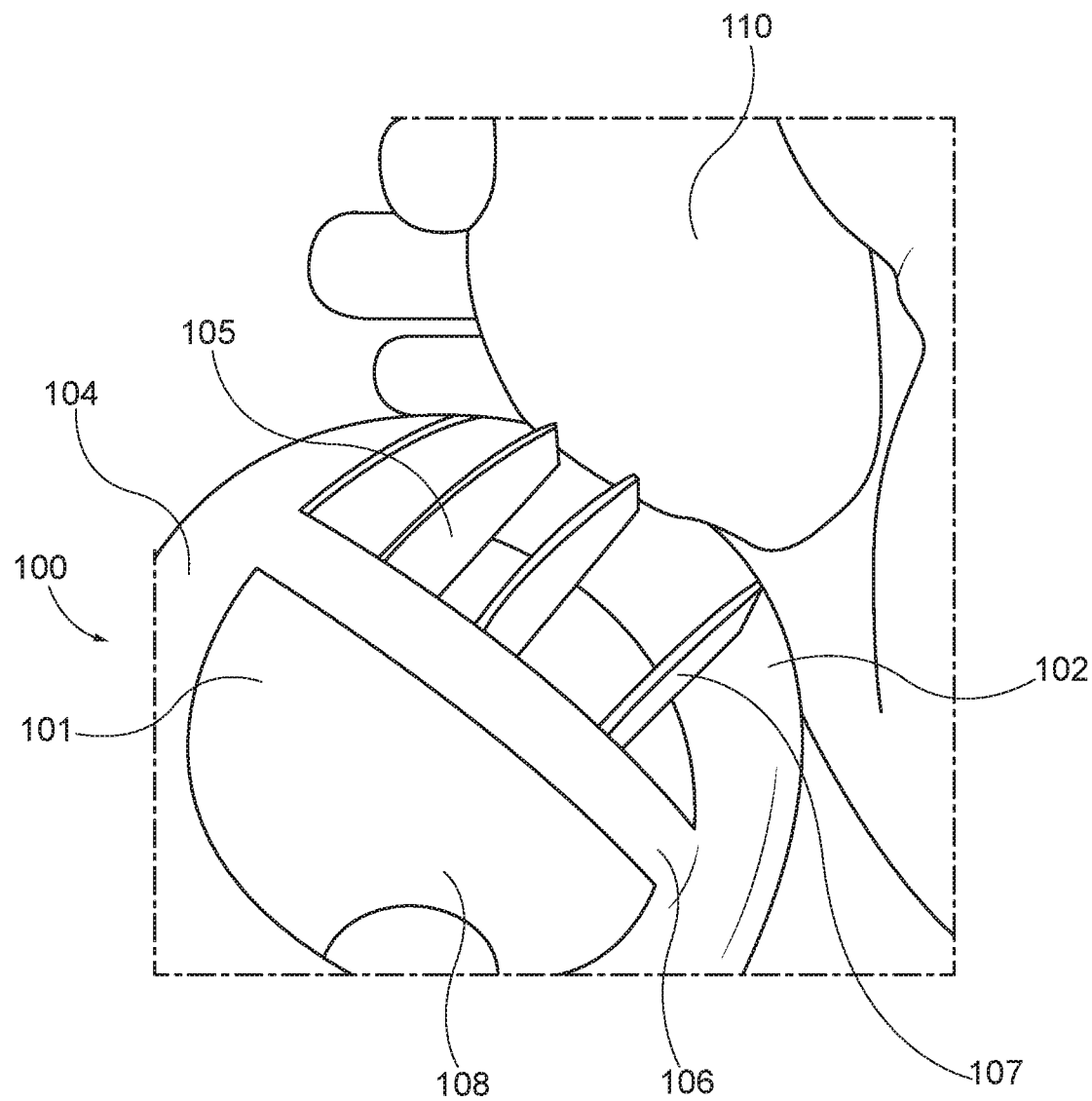
FIG. 5 is a view of the processing device being used.

As shown in FIG. 5, during use of the processing device 100 a fruit 110 is pressed against the processing device 100. The motion of the fruit 110 against the lip 102 and the blades 105, 107 of the processing device 100 is able to remove the skin of the fruit 110 and slice the fruit 110 simultaneously. In an embodiment, the processing device can be used to slice and dice a whole fruit or vegetable. In an embodiment, the processing device can be used to slice a portion of a whole fruit or vegetable.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A processing device for fruits or vegetables comprising:
   a lip forming a portion of a circular-shaped perimeter of the processing device;
   an arc-shaped blade support structure extending and bridging from one portion of the circular-shaped perimeter to another portion of the circular-shaped perimeter; and
   at least three blades, wherein at least two of the three blades are differently sized, wherein each of the at least three blades extends from the arc-shaped blade support structure to the lip forming the portion of the circular-shaped perimeter of the processing device; and
   a crescent-shaped opening formed by the arc-shaped blade support structure and the circular-shaped perimeter of the processing device when viewed from a top-down view of the processing device, wherein the crescent-shaped opening has no blades located therein, wherein the crescent-shaped opening comprises at least a third of the processing device, and
   a base portion secured to the circular-shaped perimeter, wherein the circular-shaped perimeter is adapted to fit on a rim of a cup when the base portion is located within an interior space of the cup.

2. The processing device of claim 1, wherein the processing device is adapted to be secured to the cup, wherein the cup is a glass.

3. The processing device of claim 1, wherein the at least three blades each extend at an angle from the arc-shaped blade support structure to the lip.

4. The processing device of claim 1, wherein the cup is a glass, and wherein each of the at least three blades extends in an angled direction, towards a bottom of the glass when the processing device is secured to the glass, from the arc-shaped blade support structure to the lip.

5. A processing system for fruits or vegetables comprising:
   a cup;
   a processing device comprising:
      a lip forming a portion of a circular-shaped perimeter of the processing device;
      a base portion secured to the circular-shaped perimeter, wherein the circular-shaped perimeter is secured to the cup when the base portion is located within an interior space of the cup;
      an arc-shaped blade support structure extending and bridging from one portion of the circular-shaped perimeter to another portion of the circular-shaped perimeter;
      at least three blades, wherein at least two of the at least three blades are differently sized, wherein each of the at least three blades extends from the arc-shaped blade support structure to the lip forming the portion of the circular-shaped perimeter of the processing device; and a crescent-shaped opening formed by the arc-shaped blade support structure and the circular-shaped perimeter of the processing device when viewed from a top-down view of the processing device, wherein the crescent-shaped opening has no blades located therein, and wherein the crescent-shaped opening comprises at least a third of the processing device.

6. The processing system of claim 5, wherein the cup is formed from glass.

7. The processing system of claim 5, wherein the cup is pint-sized.

8. The processing device of claim 5, wherein the at least three blades each extends at an angle from the arc-shaped blade support structure to the lip.

9. The processing device of claim 8, wherein the cup is a glass, and wherein each of the at least three blades extends in an angled direction, towards a bottom of the glass when the processing device is secured to the glass, from the arc-shaped blade support structure to the lip.

10. The processing system of claim 5, wherein each of the at least three blades is parallel to each other.

11. The processing system of claim 5, wherein the arc-shaped blade support structure extending from one portion of the circular-shaped perimeter to another portion of the circular-shaped perimeter is a distance that is less than a diameter of a circle formed by the circle-shaped perimeter.

* * * * *